(12) United States Patent
Mayer

(10) Patent No.: US 8,074,230 B2
(45) Date of Patent: Dec. 6, 2011

(54) METHOD AND SYSTEM FOR DYNAMIC CONTEXT BASED CONTACT SERVICE

(75) Inventor: Paul G. Mayer, Mountain View, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1104 days.

(21) Appl. No.: 11/904,956

(22) Filed: Sep. 27, 2007

(65) Prior Publication Data

US 2009/0089806 A1    Apr. 2, 2009

(51) Int. Cl.
    *G06F 13/00* (2006.01)
(52) U.S. Cl. ........................................ 719/318
(58) Field of Classification Search ........................ None
    See application file for complete search history.

(56) References Cited

U.S. PATENT DOCUMENTS

| | | | |
|---|---|---|---|
| 6,968,052 B2* | 11/2005 | Wullert, II | 379/210.01 |
| 2003/0220976 A1* | 11/2003 | Malik | 709/206 |
| 2005/0120306 A1* | 6/2005 | Klassen et al. | 715/765 |
| 2006/0101119 A1* | 5/2006 | Qureshi et al. | 709/206 |
| 2007/0150444 A1* | 6/2007 | Chesnais et al. | 707/3 |

* cited by examiner

*Primary Examiner* — S Sough
*Assistant Examiner* — Phuong Hoang
(74) *Attorney, Agent, or Firm* — Buchanan Ingersoll & Rooney PC

(57) ABSTRACT

A method, system, and computer readable medium, the method including monitoring an application for the occurrence of a predetermined event associated with the application; collecting, in response to the occurrence of the predetermined event, contact information associated with the application; associating the collected contact information with an entry of a contact list; and placing a call by using the contact list entry.

18 Claims, 2 Drawing Sheets

METHOD AND SYSTEM FOR DYNAMIC CONTEXT BASED CONTACT SERVICE

BACKGROUND

1. Field

Embodiments may generally relate to methods and systems for managing a contact list. More particularly, some embodiments are concerned with providing a dynamic context based contact service.

2. Description

A number of applications include functionality that allows a user to make a "click-to-dial" call while working with or from within the application. However, such functionality is the result of the incorporation of such features into the design of the application. Accordingly, such features require either designing the enabling functionality into the application or reworking the application through later revisions. In both instances, it is noted that the desired functionality is based on the functionality of the underlying application.

Additionally, contact information gathered from one application, including an application that incorporates "click-to-dial" functionality, may be limited to working with contacts from the source application or at best, a limited number and type of other applications. In some instances, accessing contact information from multiple sources, even using the same application, may require a user to have direct access to the contact information or the source of the contact information. For example, a user wishing to initiate a teleconference with the author of a document and those providing emailed comments on the document may have to open the document to determine and/or access the contact information of the author, as well as open the emails to determine and/or access the contact information of the email senders. This sample task is cumbersome enough in an office environment where the user is accessing the various applications using a desktop PC but it is further complicated by a user using mobile devices (e.g., mobile phone, PDA, etc.) to coordinate and initiate the teleconference.

As such, there exists a need for a system, method, and computer executable program for managing and providing a context based contact service.

SUMMARY

Some embodiments provide a system, method, device, program code and/or means to provide and manage a dynamic context based contact service. In some embodiments, a method includes monitoring an application for the occurrence of a predetermined event associated with the application; collecting, in response to the occurrence of the predetermined event, contact information associated with the application; associating the collected contact information with an entry of a contact list; and placing a call by using the contact list entry.

Some embodiments may include a system for implementing the methods herein. The methods may be implemented using hardware elements, software elements, and combinations thereof. A system including embodiments herein may include an event monitor to monitor an application for an occurrence of a predetermined event associated with the application; an event service to collect, in response to the occurrence of the predetermined event, contact information associated with the application; and a contact list manager to associate the collected contact information with an entry of a contact list and to facilitate placing a call using the contact list entry.

Some embodiments include a medium having machine readable program instructions stored thereon, including instructions to monitor an application for the occurrence of a predetermined event associated with the application; instructions to collect, in response to the occurrence of the predetermined event, contact information associated with the application; instructions to associate the collected contact information with an entry of a contact list; and instructions to place a call using the contact list entry.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
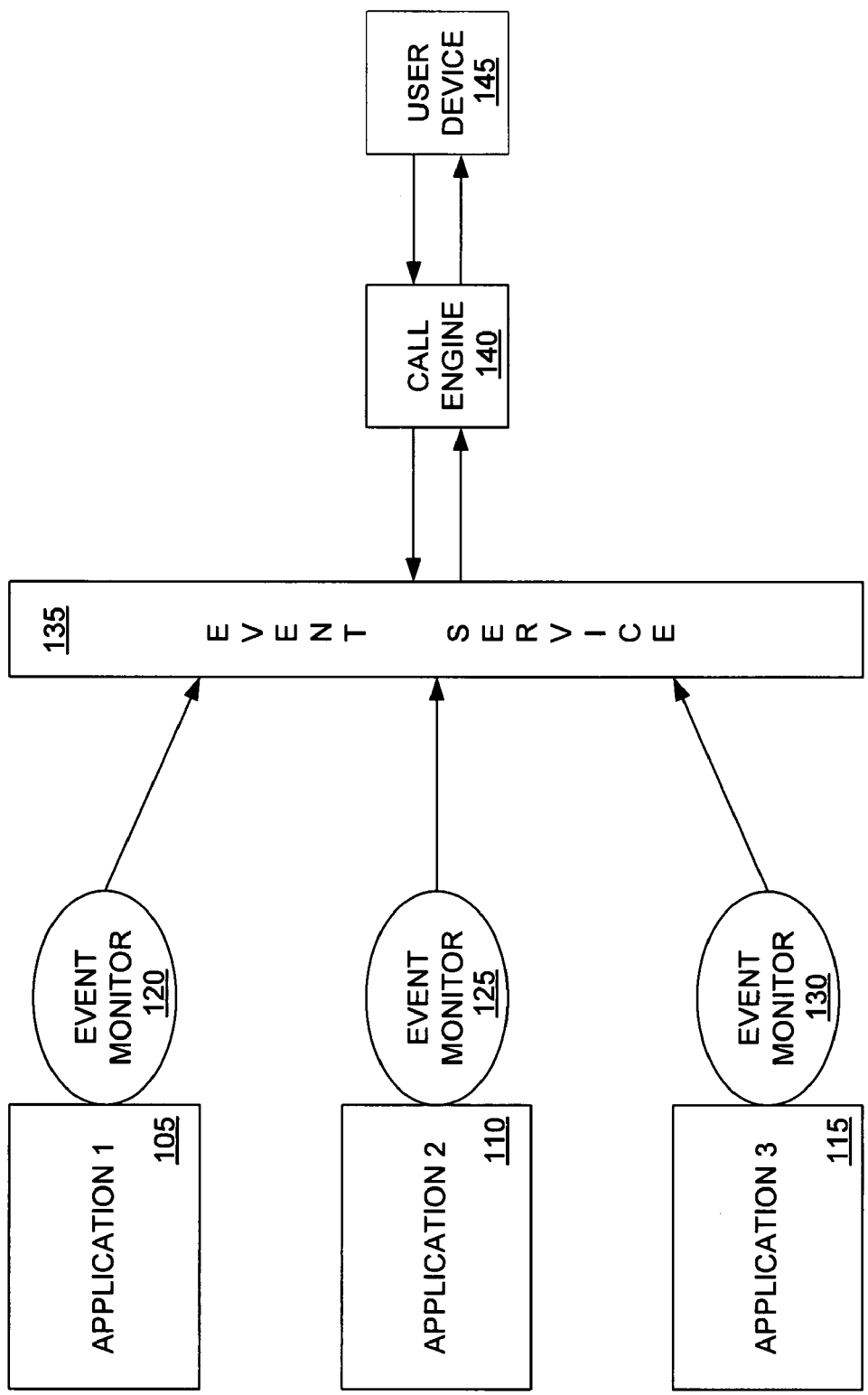
FIG. 1 is an exemplary depiction of a block diagram of a system, according to some embodiments herein.

FIG. 1 is an illustrative block diagram of a system 100, in accord with some embodiments herein. System 100 may provide a mechanism for facilitating the management of a dynamic context based contact service. System 100 includes an application, an event monitor, an event service 135 and a contact list manage 140. In the example of FIG. 1, three applications 105, 110, 115 are depicted. It is consistent with the disclosure herein that system 100 may include fewer or more applications than those specifically shown in FIG. 1. Three event monitors 120, 125, and 130 are also shown in FIG. 1. Each of the event monitors is provided to monitor the actions, events, and status of the application with which it is associated or interfaced with.

In some embodiments, the event monitors function to monitor the associated application for the occurrence of specific events, actions, states, etc. For example, event monitor 120 monitors application 105, event monitor 125 monitors application 110, and event monitor 130 monitors application 115. In some embodiments, each of the event monitors 120, 125, 130 monitor a specific application (e.g., applications 105, 110, 115) for the occurrence of at least one event, action, process, state, or state change.

Embodiments of the present disclosure encompass the event monitors monitoring their associated application for the occurrence of predefined or predetermined events. In this manner, the event monitors may effectively detect and report the occurrence of event to be monitored, even upon an initial occurrence of the event occurring for the associated application.

In some embodiments the event or occurrence for which the application 105, 1110, 115 is being monitored may include an application event such as, for example, opening a text based document, a spreadsheet, a presentation file, and a particular type of media related file. The opening of any of these, or any other specified or defined, files may be regarded as the occurrence of a monitored event associated with the pertinent application. In some embodiments, the event may correspond to the receipt, access, or generation of an email, text message, instant message (IM), and other communications.

In some embodiments, the particular event or events being monitored by event monitor 120, 125, 130 may be customized to facilitate a particular user's needs or desires. For example, the event monitor may monitor an application for the opening, generation, or otherwise interaction with a document conforming to a specific configuration or template such as, for example, a company expense report. The opening, generation, or accessing of the company expense report (i.e., the event) conforming to a specific business process template by application 110 may be one of the events monitored by event monitor 125.

In some embodiments, event service 135 functions to collect contact information associated with application 105, 110, 115 in response to the occurrence of the event being monitored and detected by event monitor 120, 125, 130. Event service 135 may manage the extraction and collection of contact information associated the monitored application 105, 110, 115. For example, event monitor 130 may be monitoring application 115 for the opening of a text-based document. When event monitor 130 detects that application 115, a word processor, opens a text-based filed sent as an attachment to an email, event service 135 may operate to extract contact information from the opened file by, for example, extracting data indicative of the author of the document. In some instances, depending on the format of the file, file attributes, and/or the functionality of the monitored application, the contact information may be obtained from a file header, a tag associated with the document, and the application data associated with the file.

Event service 135 may provide the collected contact information to contact list manager 140. The collected contact information may be associated with an entry of a contact list (e.g., personal address book, group contact list, and enterprise address book, etc.) The process of associating the collected contact information with the entry of a contact list may include creating the entry, updating the entry, and replacing the entry with newly collected contact information.

The collected contact information may include, in part or in full, a name, a post office address, a callable address such as an email address, phone number, IM identification, a web site URL, and other identifying contact information. In some embodiments, event service 135 may attempt to augment the collected contact information with other data from the monitored application (e.g., an email program) and sources other than the monitored application. For example, event service 135 may seek to verify or complete the contact information collected and extracted from application 115 by referencing a personal address book of the user using the monitored application, by referencing a company contact list associated with the user, accessing search results of a search engine or other data source such as a web-based directory.

In some embodiments, the contact information may be stored in a central data store (e.g., a database) accessible to other devices. Contact list manager 140 may download the contact information to a central location. In this manner, the centrally stored contact information may be accessible for use by a number and variety of user devices 145, systems, and entities in communication with contact list manager 140.

User device 145 may contact the contact list manager to place a call to the entity associated with and referenced by a contact list entry managed under the direction of contact list manager 140.

In some embodiments, contact list manager 140 may further provide a mechanism and service to prioritize contact information collected from the various monitored applications 105, 110, 115. The prioritization of the collected contact information by contact list manager 140 may include dynamically revising, updating, and creating contact list entries based on the particular applications being monitored. For example, the prioritizing of the collected contact information may include managing a contact list, directory, or address book to include or rank contact information based on when the contact information was collected (e.g., keep or maintain the most recent 15 entry updates), the status of the monitored application (e.g., only entries associated with currently open or most recently opened applications kept active or highly ranked), the monitored application wherein contact information extracted from some applications is given priority over contact information extracted from other applications, and combinations of these and other factors/criteria.

In some embodiments, a user (not shown) may place a call using user device 145 and contact information obtained from an application 105, 110, 115 in the instance that the application itself is not designed or otherwise functional to provide a mechanism to place a call to an entity corresponding to contact information associated with the application and specifically monitored events. In this manner, system 100 may provide a mechanism to provide and mange a dynamic context based contact service. The contact service provided by system 100 is context based since, for example, the contact information is obtained with reference to the occurrence of specific events. In some embodiments, an indication of the context such as the triggering event, the associated application, the time, etc. may be maintained in association with the contact information for use or reference by a user or other processing operations.

Figure 2:
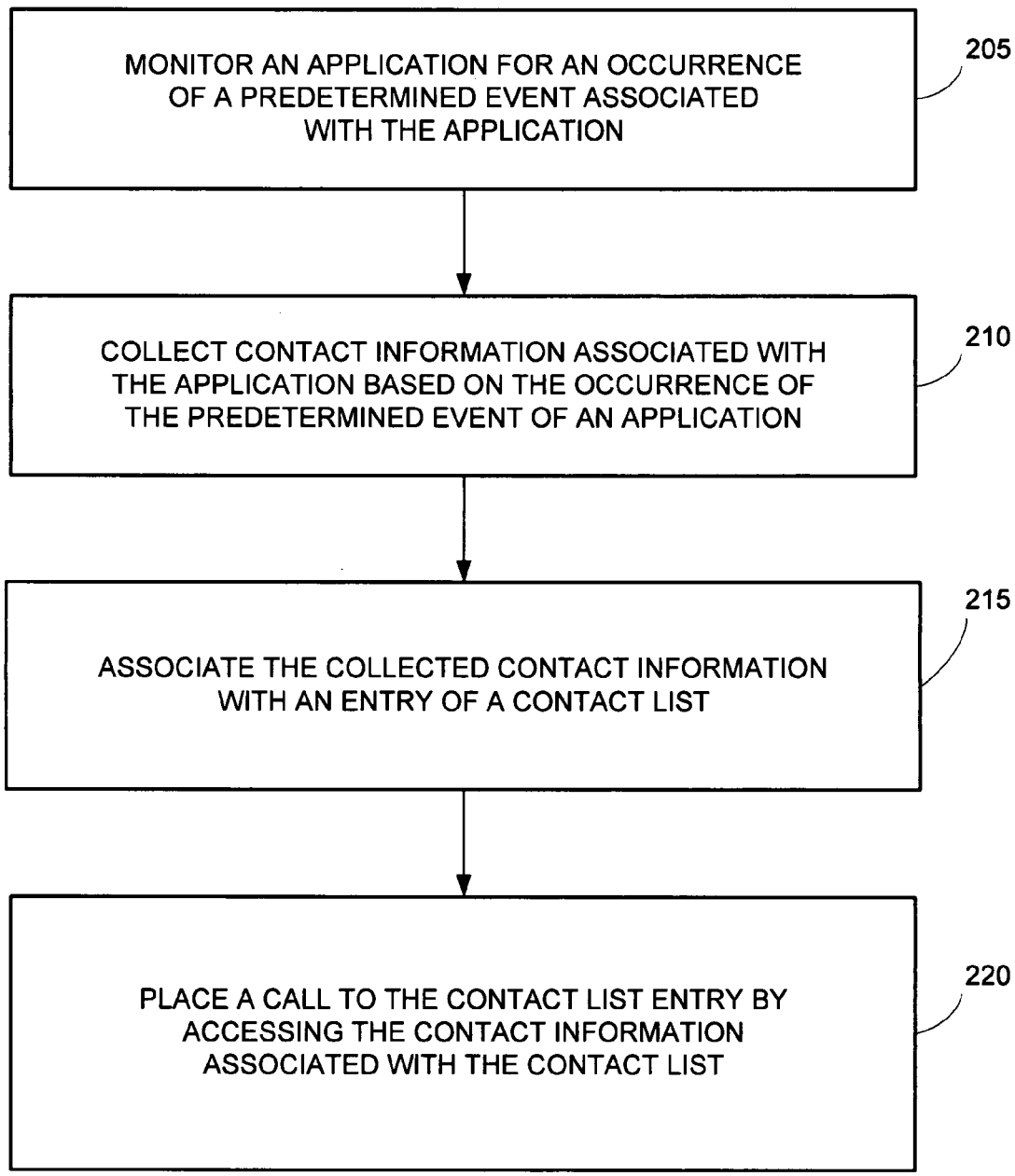
FIG. 2 is an exemplary flow diagram of a process, according to some embodiments.

FIG. 2 is an exemplary flow diagram of a process 200, in accordance with an embodiment herein. At operation 205, an application is monitored for an occurrence of a predetermined event associated with the application. In accordance with some embodiments herein, the monitored application need not include "click-to-dial" functionality, event reporting or event monitoring functionality, and contact generation or reporting functionality. Such features of the present disclosure, when utilized and/or implemented, may be provided by other aspects and mechanisms other than the application being monitored for the occurrence of specific events.

Referring to operation 210, contact information associated with the application is collected. The collecting of the contact information may be based on the occurrence of a predetermined event defined by, for example, a user, a system administrator, and system, service, device or application preference and/or requirements. As mentioned above, an event monitor may facilitate the collecting of the contact information by monitoring the associated application and extracting the contact information from the application.

At operation 215, the collected information is associated with an entry of a contact list or other data repository or placeholder for the collected contact information such as, for example, an address book (personal and enterprise-wide) and a network based directory. The associating aspects of the process may include creating, revising, and updating a contact list entry. Management of the collected contact information may be a function of contact list manager 140, which may also provide a measure of contact list prioritization.

Operation 220 refers to a process of placing a call to the contact list entry by accessing the contact information associated with the contact list. Referring to FIG. 1, user device 145, such as a mobile phone, may interact with contact list manager 140 that has access to a contact list populated and updated with contact information extracted from a monitored application 105. The contact list manager may, in a some embodiments, comprise portions (software and hardware components) of the user device or be a separate apparatus or device.

In some embodiments, such as when the contact list is centrally or otherwise stored by contact list manager 140, user device 145 may request an entry or listing of the collected contact information entries from contact list manager 140 in order to use such information in placing a call. In reply to the request for contact list information by user device 145, contact list manger 140 may send the requested contact list information to the user device so that the user device can use it to place a call. In some other instances, such as when the contact list is forwarded to user device 145 for storage, then the user device may make a call using the contact list information based on the locally stored contact information without further interaction with contact list manager 140.

In accordance herewith, a word processor application 105 may be monitored by event monitor 120 for the occurrence of a certain event such as the opening of a text-based document and an email client application 110 may be monitored by event monitor 125 for the occurrence of a certain event such as the receipt of an email commenting on the document opened by application 105. Contact information from the text document opened by application 105 may be extracted by event monitor 120 and forwarded to event service 135. Additionally, contact information from the email received by application 110 may be extracted by event monitor 125 and forwarded to event service 135. Event service 135 may be provided by a server based application.

The two instances of collected contact information from event monitors 120 and 125 may relate to a common entity (e.g., individual, company, workgroup, etc.) or separate and different entities. The collected contact information may be further processed by being downloaded to a central database or a distributed data store for access by contact list manager 140. Contact list manager 140 may interact with event service 135 to receive updated, revised, and new contact information provided based on the occurrence of certain events by monitored applications 105 and 110. The contact list manager may make requests of event service 135 and in turn be provided with the requested information or service. In this manner, a user device 145 such as a "soft phone" or a mobile phone may access the updated, revised, and new contact information from applications 105 and 110 by interacting with contact list manager 140. As shown, the need for user device 145 to have direct access to or knowledge of applications 105 and 110 may be avoided by the systems and methods disclosed herein in connection with some embodiments.

In some embodiments, a contact list or other directory provided with the updated, revised, and new contact information may be dynamic. Such a contact list or directory may be referred to as being dynamic since, for example, it changes based on the occurrence of certain, monitored for events by the associated applications. In some aspects, the contact list or directory is dynamic since some embodiments herein may include changing or updating the contact list accessed by a user device 145 based on a determined or predetermined number of contact list entries. For example, the contact list may be constrained to include the most recently added, updated, or revised contacts (i.e., last 20); the most recently added, updated, or revised contacts related to a specific event occurrence; the most recently added, updated, or revised contacts related to a specific monitored application; and combinations thereof. In some embodiments, the number, type, and variety of contact list entries provided to contact list manager 140 for use by a user device 145 may be determined, at least in part, by the user device used. For example, the number, type, and variety of contact list entries provided to contact list manager 140 may be based on the configuration of the, for example, mobile phone (specific device or device "class") used to access the contact list.

In some embodiments, the methods and systems disclosed herein may be implemented by a combination of hardware and software components. In some aspects, the methods and systems may be accomplished, at least in part, using computing processors to execute computer code and program instructions stored on a memory (e.g., flash memory, RAM, ROM, disk drive, and other media) or otherwise accessible by the processor.

Embodiments described above are not intended to be limited to the specific forms set forth herein, but are intended to cover such alternatives, modifications and equivalents as can reasonably be included within the spirit and scope of the appended claims.

What is claimed is:

1. A method comprising:
a plurality of event monitors monitoring a plurality of applications for an occurrence of at least one predetermined event and at least one of the event monitors extracting contact information from at least one application of the applications in response to a detection of the at least one predetermined event and sending the extracted contact information to at least one event service;
the at least one event service receiving the extracted contact information from at least one of the event monitors;
the at least one event service providing the received extracted contact information to a contact list manager, the contact list manager managing a contact list accessible to a user device;
the contact manager updating the contact list by at least one of associating the received extracted contact information with at least one entry in the contact list and adding at least one entry to the contact list with contact information of the received extracted contact information, wherein the contact manager is a device that is separate from the user device and is comprised of hardware components and software components;
the user device requesting an entry for a contact of the contact list or listing of entries for contacts of the contact list from the contact manager for use in placing a call;
the contact manager providing the entry or listing of entries to the user device; and
the user device placing a call utilizing the entry or the listing of entries.

2. The method of claim 1, wherein the predetermined event is accessing at least one of a file, a text message, an instant message, a SMS (short message service) message, and a MMS (multimedia messaging service) message.

3. The method of claim 1, wherein the user device is a mobile phone or a device having a computer processor to execute code stored on memory accessible by the computer processor.

4. The method of claim 1, further comprising storing the contact list in a non-transitory memory.

5. The method of claim 1, wherein the user device is a communication device for placing the call.

6. The method of claim 1, wherein the contact list is at least one of a personal contact list associated with one individual, a contact list associated with more than one individual, and a company contact list.

7. The method of claim 1, further comprising:
the contact manager obtaining additional information related to the collected contact information from a source other than the at least one application; and
the contact manager associating the additional information and the collected contact information with at least one entry of the contact list.

8. The method of claim 1, wherein the entry on the contact list expires after one of: a passage of time, and a predetermined number of additional associations of collected contact information are made with entries of the contact list.

9. A communication system comprising:
event monitors monitoring applications for an occurrence of at least one predetermined event;
at least one event service receiving contact information from at least one of the event monitors in response to the at least one event monitor detecting an occurrence of the at least one predetermined event, the received contact information being extracted from at least one of the applications monitored by that at least one event monitor;
a user device;
a contact list manager managing a contact list accessible to the user device;
the at least one event service providing the received contact information to the contact list manager;
the contact manager updating the contact list by at least one of associating the received contact information with at least one entry for at least one contact of the contact list and adding at least one contact to the contact list with contact information of the received contact information, wherein the contact manager is a device that is separate from the user device and is comprised of hardware components and software components;
the user device requesting an entry or a listing of entries of the contact list from the contact manager for use in placing a call;
the contact manager providing the entry or listing of entries to the user device; and
the user device placing a call utilizing the entry or the listing of entries.

10. The system of claim 9, wherein the predetermined event is accessing at least one of a file, a text message, an instant message, a SMS (short message service) message, and a MMS (multimedia messaging service) message.

11. The system of claim 9, wherein the user device is a mobile phone or a device having a computer processor to execute code stored on memory accessible by the computer processor.

12. The system of claim 9, wherein the user device is a user communication device or a mobile phone.

13. The system of claim 9, wherein the contact list is at least one of a personal contact list associated with one individual, a contact list associated with more than one individual, and a company contact list.

14. The system of claim 9, wherein
the contact manager also obtaining additional information related to the collected contact information from a source other than the at least one application; and
associating the additional information and the collected contact information with the entry of the contact list.

15. The system of claim 9, wherein the entry on the contact list expires after one of: a passage of time, and a predetermined number of additional associations of collected contact information are made with entries of the contact list.

16. A non-transitory computer readable medium having computer-executable instructions stored thereon, the instructions defining a method executable by at least one device that processes the instructions of the medium, the method defined by the instructions comprising:
event monitors monitoring applications for an occurrence of at least one predetermined event and extracting contact information from at least one of the applications in response to a detection of the at least one predetermined event;
at least one event service receiving contact information extracted from the at least one application monitored by at least one of the event monitors:
the at least one event service providing the received extracted contact information to a contact list manager, the contact list manager managing a contact list accessible to a user device;
the contact manager updating the contact list by at least one of associating the received extracted contact information with contacts in the contact list and adding contacts to the contact list with contact information of the received extracted contact information, wherein the contact manager is a device that is separate from the user device and is comprised of hardware components and software components;
the user device requesting an entry or listing of entries of the contact list from the contact manager for use in placing a call, the entry or listing of entries comprising contact information of at least one contact of the contact list;
the contact manager providing the entry or listing of entries to the user device; and
the user device placing a call utilizing the entry or the listing of entries.

17. The medium of claim 16, wherein the predetermined event is
accessing at least one of a file, a text message, an instant message, a SMS (short message service) message, and a MMS (multimedia messaging service) message.

18. The medium of claim 16, wherein the contact list entry expires after one of: a passage of time, and a predetermined number of additional associations of collected contact information are made with entries of the contact list.

* * * * *